(12) United States Patent
Nakano et al.

(10) Patent No.: US 12,018,742 B2
(45) Date of Patent: Jun. 25, 2024

(54) SENSOR ARRANGEMENT STRUCTURE (71) Applicants: JATCO Ltd, Fuji (JP); NISSAN MOTOR CO., LTD., Yokohama (JP)

(72) Inventors: Yusuke Nakano, Yamato (JP); Fumikazu Nagaoka, Shizuoka (JP); Hui Jin, Kawasaki (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/260,994

(22) PCT Filed: Jan. 18, 2022

(86) PCT No.: PCT/JP2022/001500
§ 371 (c)(1),
(2) Date: Jul. 11, 2023

(87) PCT Pub. No.: WO2022/176472
PCT Pub. Date: Aug. 25, 2022

(65) Prior Publication Data
US 2024/0060556 A1 Feb. 22, 2024

(30) Foreign Application Priority Data
Feb. 22, 2021 (JP) ................. 2021-026257

(51) Int. Cl.
*F16H 55/56* (2006.01)
*F16H 9/12* (2006.01)
(52) U.S. Cl.
CPC ............... *F16H 55/56* (2013.01); *F16H 9/12* (2013.01)

(58) Field of Classification Search
CPC ............ F16H 61/66259; F16H 61/662; F16H 61/66272; F16H 9/18; F16H 55/56; F16H 63/065
USPC .......................................................... 474/28
See application file for complete search history.

(56) References Cited

U.S. PATENT DOCUMENTS

| 5,643,116 A * | 7/1997 | Genzel ............. F16H 61/66272 474/18 |
| 6,089,999 A * | 7/2000 | Imaida .................... F16H 55/56 474/18 |
| 6,392,405 B1 * | 5/2002 | Nishizaki ................. G01P 1/00 29/894 |
| 6,498,475 B2 * | 12/2002 | Foster .................... G01P 3/488 29/894 |

(Continued)

FOREIGN PATENT DOCUMENTS

| JP | 2008-275017 A | 11/2008 |
| JP | 2010-181018 A | 8/2010 |
| JP | 2012-047324 A | 3/2012 |

*Primary Examiner* — Henry Y Liu
(74) *Attorney, Agent, or Firm* — Foley & Lardner LLP (57) ABSTRACT

The sensor arrangement structure includes a pulley that rotates about a rotation axis; and a sensor that detects rotation of the pulley. The pulley includes a fixed pulley, a movable pulley that can be displaced relative to the fixed pulley in a direction of the rotation axis, and a plunger defining an oil chamber on a back of the movable pulley. The plunger is provided with a detection target portion in a region that can be visually recognized from the direction of the rotation axis, and the sensor is provided on a support portion that rotatably supports the fixed pulley in a direction along the rotation axis and faces the region in which the detection target portion is provided.

6 Claims, 10 Drawing Sheets

(56) References Cited

U.S. PATENT DOCUMENTS

| | | | | |
|---|---|---|---|---|
| 6,591,177 | B1* | 7/2003 | Loffler | F16H 61/12 474/18 |
| 6,642,709 | B2* | 11/2003 | Heimann, Jr. | G01P 3/443 324/207.22 |
| 6,749,530 | B2* | 6/2004 | Okano | F16H 59/38 474/70 |
| 7,341,533 | B2* | 3/2008 | Wang | F16H 57/021 427/451 |
| 7,566,287 | B2* | 7/2009 | Onishi | F16D 43/216 192/85.41 |
| 7,686,715 | B2* | 3/2010 | Carlson | F16H 63/065 474/18 |
| 8,460,137 | B2* | 6/2013 | Kajigaya | F16H 9/18 474/18 |
| 9,222,808 | B2* | 12/2015 | Fukuda | G01D 5/3473 |
| 11,754,151 | B2* | 9/2023 | Kuroki | F16H 63/065 474/28 |
| 11,802,811 | B2* | 10/2023 | Frost | G01L 5/105 |
| 11,835,134 | B2* | 12/2023 | Kuroki | F16H 9/18 |
| 2002/0142870 | A1* | 10/2002 | Okano | F16H 9/125 474/18 |
| 2002/0160867 | A1* | 10/2002 | Katou | F16H 61/66272 474/18 |
| 2004/0061493 | A1* | 4/2004 | Fishburn | G01P 3/488 324/207.22 |
| 2004/0094383 | A1* | 5/2004 | Kinoshita | F16D 25/12 192/85.61 |
| 2005/0090340 | A1* | 4/2005 | Wang | F16H 55/56 474/8 |
| 2006/0030454 | A1* | 2/2006 | Uchisasai | B60W 10/06 477/77 |
| 2007/0066443 | A1* | 3/2007 | Matsudaira | F16H 61/0213 477/115 |
| 2013/0138310 | A1* | 5/2013 | Kushiyama | F16H 61/66272 701/60 |
| 2014/0174570 | A1* | 6/2014 | Kanehara | F15B 15/20 137/565.16 |
| 2015/0088388 | A1* | 3/2015 | Kanehara | F16H 61/66272 701/51 |
| 2016/0229406 | A1* | 8/2016 | Okabe | B60W 10/10 |
| 2018/0180178 | A1* | 6/2018 | Inoue | F16H 61/0021 |
| 2018/0194226 | A1* | 7/2018 | Tanizoe | F16H 63/40 |
| 2018/0274672 | A1* | 9/2018 | Kondo | G05B 23/02 |
| 2018/0281799 | A1* | 10/2018 | Kawamoto | F02D 29/00 |
| 2019/0195343 | A1* | 6/2019 | Toyota | F16H 61/00 |
| 2019/0203833 | A1* | 7/2019 | Toyota | F16H 61/0031 |
| 2019/0257413 | A1* | 8/2019 | Toyota | F16H 61/0031 |
| 2019/0323581 | A1* | 10/2019 | Terai | F16H 9/12 |
| 2019/0338852 | A1* | 11/2019 | Nakano | F16H 61/66 |
| 2019/0346040 | A1* | 11/2019 | Terai | F16H 9/18 |
| 2020/0063613 | A1* | 2/2020 | Terai | F01M 1/16 |
| 2020/0400228 | A1* | 12/2020 | Kotsuji | F16H 61/66272 |

\* cited by examiner

ENLARGED VIEW
FIG. 3A

FIG. 10

SENSOR ARRANGEMENT STRUCTURE

TECHNICAL FIELD

The present invention relates to a sensor arrangement structure in a continuously variable transmission.

BACKGROUND ART

Patent Literature 1 discloses a belt continuously variable transmission.

CITATION LIST

Patent Literature

Patent Literature 1: JP 2012-047324 A

SUMMARY OF INVENTION

The belt continuously variable transmission in Patent Literature 1 includes a sensor that detects a rotation speed of a pulley. A movable pulley of the pulley includes a plunger.

The sensor is provided in a direction perpendicular to a rotation axis of the pulley. A detection portion of the sensor faces an outer periphery of the plunger from a radially outer side of the rotation axis.

The movable pulley can be displaced in a direction of the rotation axis. Therefore, the sensor avoids interference with components of the movable pulley.

Accordingly, there are restrictions on where the sensor can be provided in the belt continuously variable transmission. Hence, it is required to further increase a degree of freedom in providing the sensor.

A sensor arrangement structure according to one aspect of the present invention includes:
- a pulley that rotates about a rotation axis; and
- a sensor that detects rotation of the pulley, in which
- the pulley includes
  - a fixed pulley,
  - a movable pulley that can be displaced relative to the fixed pulley in a direction of the rotation axis, and
  - a plunger that defines an oil chamber on a back of the movable pulley,
- the plunger is provided with a detection target portion in a region that can be visually recognized from the direction of the rotation axis, and
- the sensor is provided on a support portion that rotatably supports the fixed pulley in a direction along the rotation axis and faces the region where the detection target portion is provided.

According to the aspect of the present invention, it is possible to increase the degree of freedom in providing the sensor.

DESCRIPTION OF EMBODIMENTS

Hereinafter, an example in which a sensor arrangement structure according to one aspect of the present invention is applied to a belt continuously variable transmission 1 for a vehicle will be described.

Figure 1:
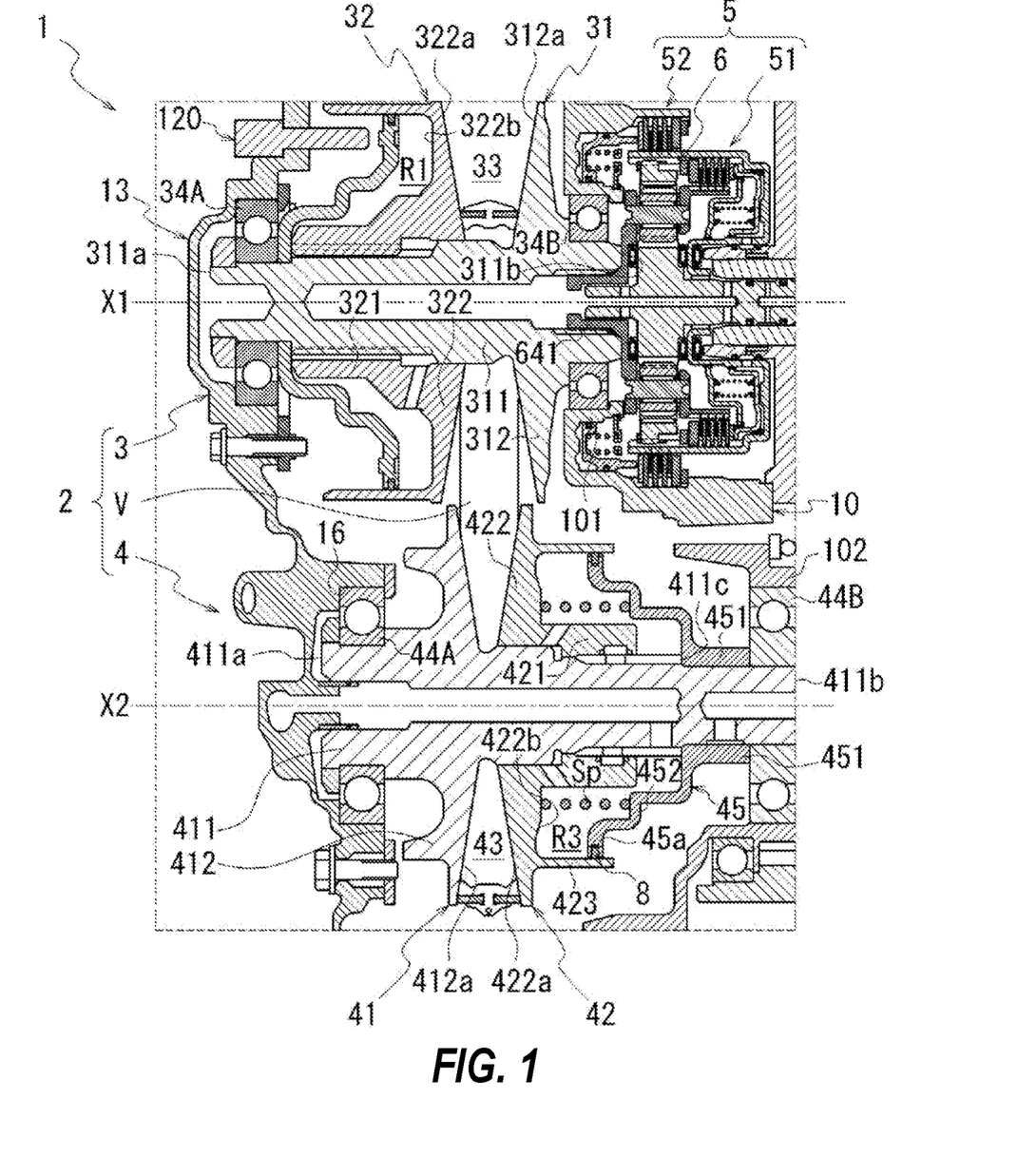
FIG. 1 shows a configuration of main parts of a continuously variable transmission.

FIG. 1 shows a configuration of main parts of the continuously variable transmission 1.

Figure 2:
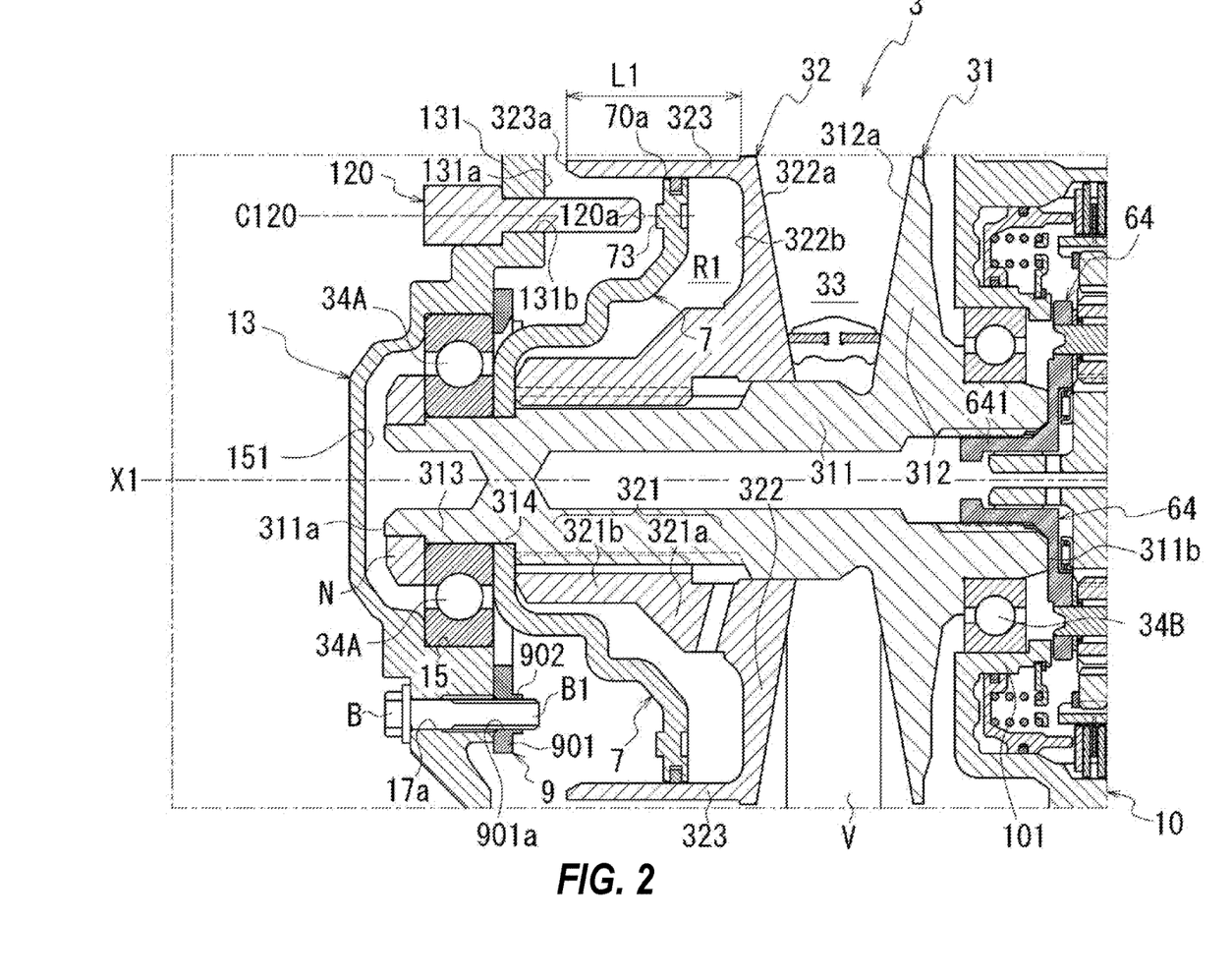
FIG. 2 is an enlarged view showing surroundings of a primary pulley of the continuously variable transmission.

FIG. 2 is an enlarged view showing surroundings of a primary pulley 3 of the continuously variable transmission 1.

As shown in FIG. 1, in the belt continuously variable transmission 1, a rotational driving force of an engine (not shown) is input to a forward and reverse switching mechanism 5 via a torque converter (not shown).

The forward and reverse switching mechanism 5 includes a planetary gear set 6, a forward clutch 51, and a reverse brake 52.

In the forward and reverse switching mechanism 5, when the forward clutch 51 is engaged, rotation received from the torque converter is output to a variator 2 in forward rotation. When the reverse brake 52 is engaged, the rotation received from the torque converter is output to the variator 2 in reverse rotation.

The variator 2 includes a pair of pulleys (a primary pulley 3 and a secondary pulley 4) and a belt V (an endless annular member) wound around the pair of pulleys.

In the variator 2, by changing winding radii of the belt V around the pair of pulleys (the primary pulley 3 and the secondary pulley 4), a speed of rotation received from the forward and reverse switching mechanism 5 is changed and the rotation is output to a final speed reduction mechanism (not shown).

As shown in FIG. 2, the primary pulley 3 includes a fixed pulley 31 and a movable pulley 32.

The fixed pulley 31 includes a shaft portion 311 arranged along a rotation axis X1 and a sheave portion 312 extending radially outward from an outer periphery of the shaft portion 311.

Bearings 34A and 34B are externally fitted and fixed to one end 311a and the other end 311b of the shaft portion 311 in a longitudinal direction, respectively.

The one end 311a of the shaft portion 311 is rotatably supported by a support hole 15 of a side cover 13 via the bearing 34A. The other end 311b of the shaft portion 311 is rotatably supported by a support portion 101 of a transmission case 10 via the bearing 34B.

A coupling member 641 included in a carrier 64 of the planetary gear set 6 (see FIG. 1) is coupled to the other end 311b of the shaft portion 311 in a relatively non-rotatable manner.

The movable pulley 32 includes an annular base portion 321 externally fitted onto the shaft portion 311 of the fixed pulley 31 and a sheave portion 322 extending radially outward from an outer periphery of the annular base portion 321.

The annular base portion 321 of the movable pulley 32 includes a large diameter portion 321a on the sheave portion 322 side and a small diameter portion 321b having an outer diameter smaller than that of the large diameter portion 321a. A thickness of the annular base portion 321 in a radial direction of the rotation axis X1 increases toward the sheave portion 322.

The annular base portion 321 of the movable pulley 32 is spline-fitted to the outer periphery of the shaft portion 311. The movable pulley 32 is movable in an axial direction of the shaft portion 311 (a direction of the rotation axis X1) in a state where relative rotation with respect to the fixed pulley 31 is restricted.

The sheave portion 312 of the fixed pulley 31 and the sheave portion 322 of the movable pulley 32 face each other with an interval therebetween in the direction of the rotation axis X1.

In the primary pulley 3, a V-shaped groove 33 around which the belt V is wound is formed between a sheave surface 312a of the fixed pulley 31 and a sheave surface 322a of the movable pulley 32.

On an outer diameter side of the sheave portion 322, a cylinder portion 323 having a cylindrical shape is provided on a back 322b (a pressure receiving surface) opposite to the sheave surface 322a.

The cylinder portion 323 is provided in a direction along the rotation axis X1. The cylinder portion 323 is formed at a length L1 in a direction away from the sheave portion 322.

Here, a support wall portion 131 of the side cover 13 is located closer to the movable pulley 32 (right side in the drawing) than the bearing 34A. Furthermore, the support wall portion 131 extends radially outward of the rotation axis X1 on an outer diameter side relative to the bearing 34A. The support wall portion 131 serves as a support portion for a sensor 120, which will be described later.

As shown in FIG. 2, a tip end 323a of the cylinder portion 323 of the movable pulley 32 faces an inner periphery 131a of the support wall portion 131 from the direction of the rotation axis X1. When the sheave portion 322 of the movable pulley 32 is arranged at a farthest position from the sheave portion 312 of the fixed pulley 31, a gap is secured between the tip end 323a and the inner periphery 131a. In this state, the tip end 323a of the cylinder portion 323 is located near the support wall portion 131 of the side cover 13.

The cylinder portion 323 is a cylindrical wall portion that surrounds the rotation axis X1 with an interval therebetween. An outer periphery 70a of the plunger 7 is located inside the cylinder portion 323. The plunger 7 defines an oil chamber R1 between the plunger 7 and the back 322b of the sheave portion 322.

In the primary pulley 3, by adjusting a supply pressure to the oil chamber R1 provided in the movable pulley 32, the movable pulley 32 is displaced in the direction of the rotation axis X1. According to the supply pressure to the oil chamber R1, a groove width of the V-shaped groove 33 between the sheave surfaces 312a and 322a is changed and the winding radius of the belt V around the primary pulley 3 is changed.

As shown in FIG. 1, the secondary pulley 4 includes a fixed pulley 41 and a movable pulley 42.

The fixed pulley 41 includes a shaft portion 411 arranged along a rotation axis X2 and a sheave portion 412 extending radially outward from an outer periphery of the shaft portion 411.

The movable pulley 42 includes an annular base portion 421 externally fitted onto the shaft portion 411 of the fixed pulley 41 and a sheave portion 422 extending radially outward from an outer periphery of the annular base portion 421.

The sheave portion 412 of the fixed pulley 41 and the sheave portion 422 of the movable pulley 42 face each other with an interval therebetween in a direction of the rotation axis X2.

In the secondary pulley 4, a V-shaped groove 43 around which the belt V is wound is formed between a sheave surface 412a of the fixed pulley 41 and a sheave surface 422a of the movable pulley 42.

Bearings 44A and 44B are externally fitted onto the shaft portion 411 of the fixed pulley 41 at one end portion 411a and the other end portion 411b in the direction of the rotation axis X2.

The other end portion 411b of the shaft portion 411 in the direction of the rotation axis X2 is rotatably supported by a support portion 102 of the transmission case 10 via the bearing 44B.

The one end portion 411a of the shaft portion 411 in the direction of the rotation axis X2 is rotatably supported by a support hole 16 of the side cover 13 via the bearing 44A.

On the sheave portion 422 of the movable pulley 42, a cylinder portion 423 is provided on a back 422b opposite to the sheave surface 422a.

The cylinder portion 423 is provided in a direction along the rotation axis X2.

An outer periphery portion 45a of a plunger 45 faces an inner periphery of the cylinder portion 423 with a radial gap.

A D-ring 8 is attached to the outer periphery portion 45a of the plunger 45. The gap between the inner periphery of the cylinder portion 423 and the outer periphery portion 45a is sealed with the D-ring 8.

A fitting portion 451 having a cylindrical shape is provided on an inner diameter side of the plunger 45. The fitting portion 451 is spline-fitted to the outer periphery of the shaft portion 411 of the fixed pulley 41. The fitting portion 451 of the plunger 45 is positioned in the direction of the rotation axis X2 between the bearing 44B and a stepped portion 411c of the shaft portion 411.

The plunger 45 has a region adjacent to the fitting portion 451. This region extends in a direction toward the sheave portion 422 (a left direction in the drawing) from an outer diameter side of the annular base portion 421 of the movable pulley 42 and then bends toward the outer diameter side.

One end of a spring Sp abuts against a region 452 of the plunger 45, which bends toward the outer diameter side, from the direction of the rotation axis X2. The other end of the spring Sp abuts against the back 422b (a pressure receiving surface) of the sheave portion 422. The spring Sp is provided in a state where the spring Sp is compressed in the direction of the rotation axis X2. The movable pulley 42 is pressed in a direction in which a groove width of the V-shaped groove 43 is reduced (a direction in which a gear ratio of the variator 2 is set at a high side) by a biasing force applied by the spring Sp.

In the secondary pulley 4, by adjusting a supply pressure to an oil chamber R3 provided in the movable pulley 42, the movable pulley 42 is displaced in the direction of the rotation axis X2. According to the supply pressure to the oil chamber R3, the groove width of the V-shaped groove 43 between the sheave surfaces 412a and 422a is changed and the winding radius of the belt V around the secondary pulley 4 is changed.

In the present embodiment, a rotation speed of the primary pulley 3 is detected by the sensor 120. When providing the sensor 120, in order to increase a degree of freedom in providing the sensor 120, a sensor arrangement structure 100 having the following configurations is adopted.

(a) The sensor 120 is provided on the side cover 13 that rotatably supports the fixed pulley 31 in a direction along the rotation axis X1.

(b) Detection target portions (convex portions 73 described later) to be detected by the sensor 120 are provided in a region of the plunger 7, which can be visually recognized from the direction of the rotation axis X1.

Hereafter, the sensor arrangement structure 100 will be specifically described.

Figures 3, 3A:
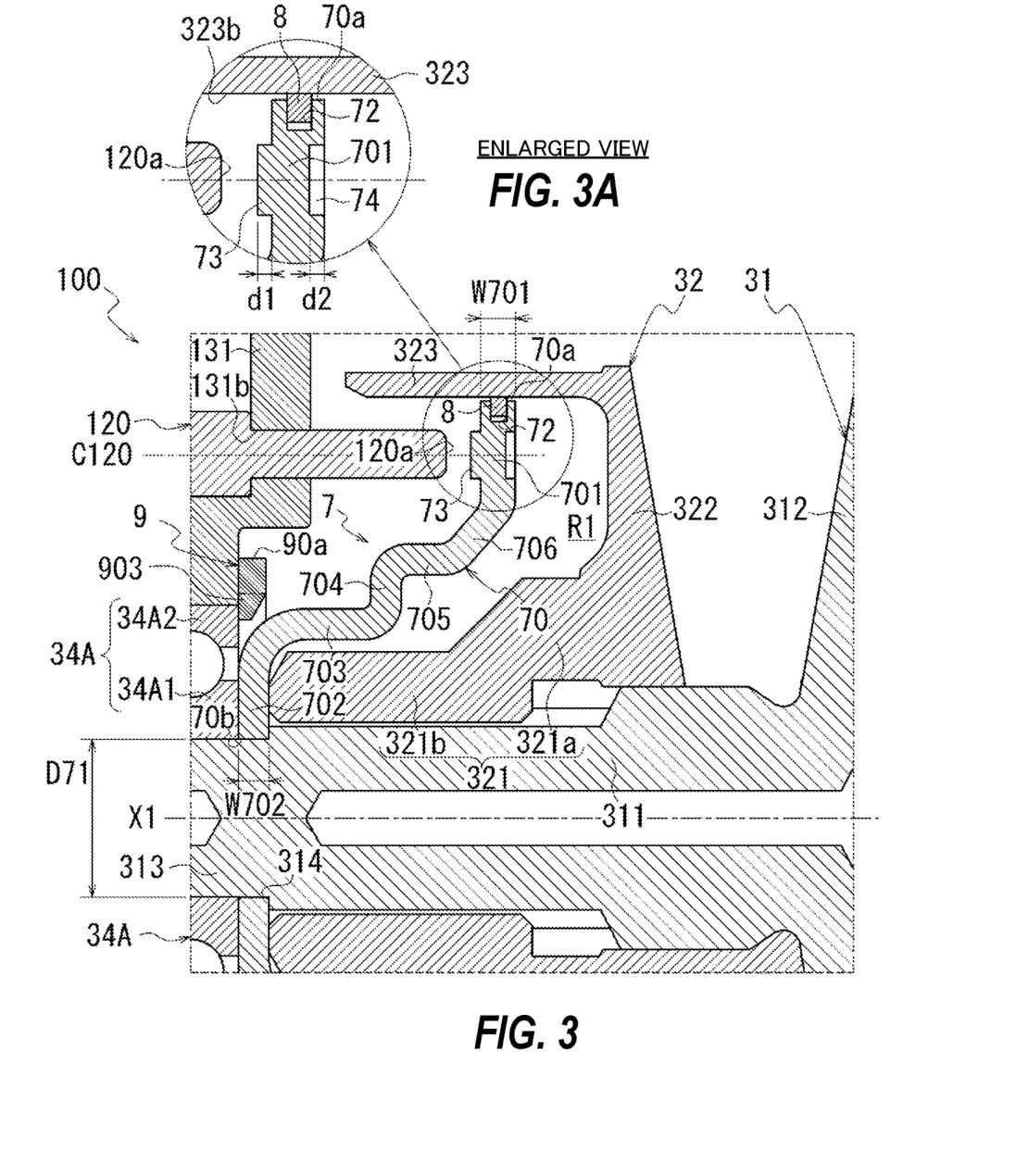
FIGS. 3 and 3A are enlarged views showing surroundings of a plunger.

FIGS. 3 and 3A are enlarged views showing surroundings of the plunger 7.

Figures 4, 4A:
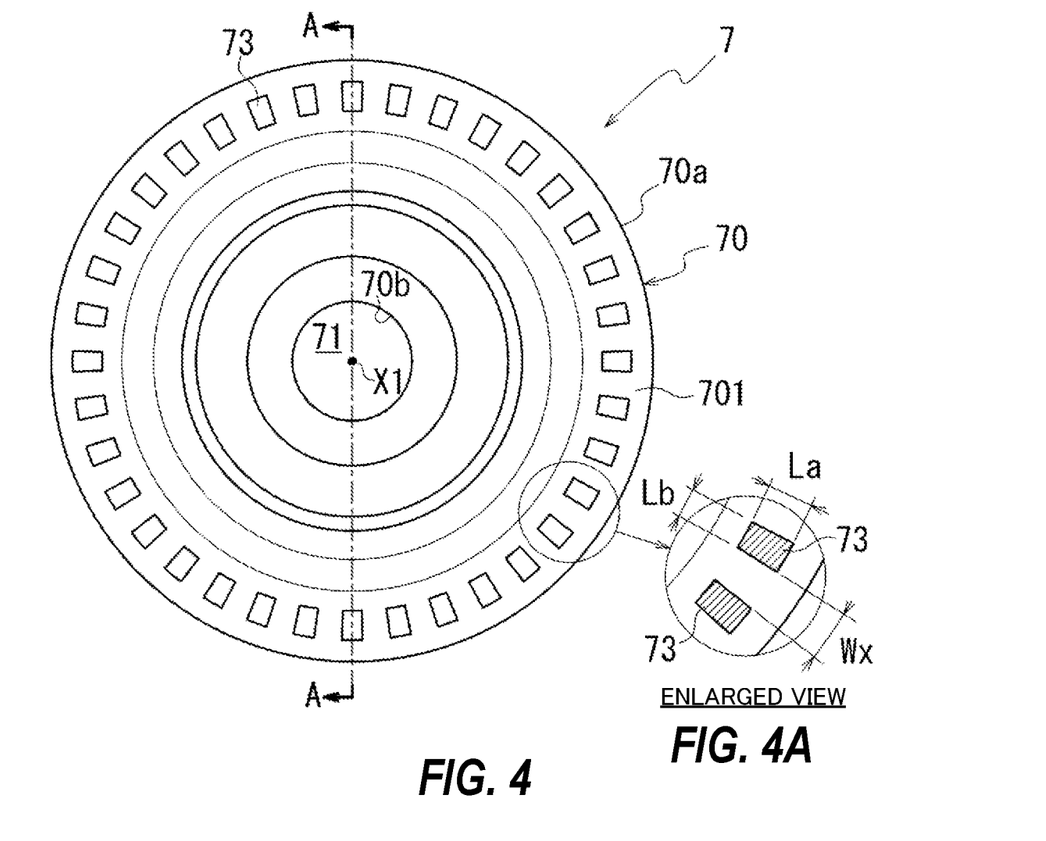
FIGS. 4 and 4A are plan views of the plunger.

FIGS. 4 and 4A are plan views of the plunger 7 when viewed from the side cover 13. In the enlarged view of FIG. 4A, in order to make positions of the convex portions 73 easy to be recognized, the portions of the convex portions 73 are hatched.

Figures 5, 5A:
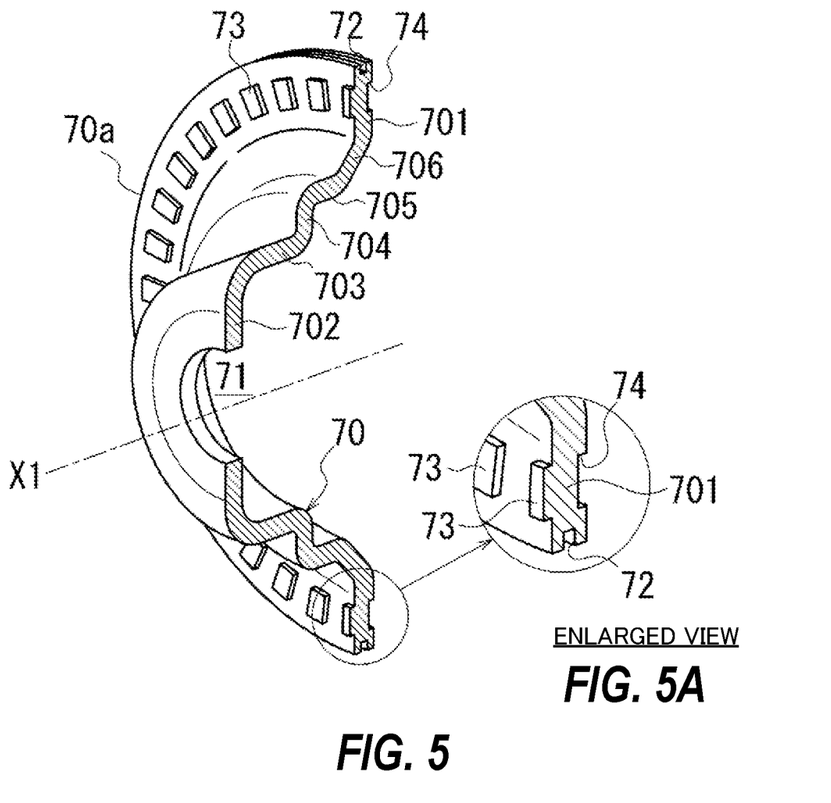
FIGS. 5 and 5A are cross-sectional views of the plunger.

FIGS. 5 and 5A are perspective views showing a cross-section of the plunger 7 taken along a line A-A in FIG. 4.

As shown in FIG. 3, the plunger 7 is a press-molded product. The plunger 7 is positioned on the outer periphery of the shaft portion 311 of the fixed pulley 31. The plunger 7 is provided in a relatively non-rotatable manner with respect to the fixed pulley 31.

As shown in FIGS. 4 and 5, an outer shape of the plunger 7 is a circular shape when viewed from the direction of the rotation axis X1. The plunger 7 includes a ring-shaped base portion 70 when viewed from the direction of the rotation axis X1.

A through hole 71 is formed in a center of the base portion 70. The through hole 71 penetrates the base portion 70 in a thickness direction (the direction of the rotation axis X1).

As shown in FIG. 3, the shaft portion 311 of the fixed pulley 31 is provided with a fitting portion 313 into which the plunger 7 is externally fitted. The through hole 71 of the base portion 70 is formed at an inner diameter D71 matching an outer diameter of the fitting portion 313.

The plunger 7 is press-fitted to an outer periphery of the fitting portion 313 and abuts against a stepped portion 314 provided on the fitting portion 313.

The bearing 34A is further press-fitted into the fitting portion 313. The plunger 7 is provided on the shaft portion 311 in a state where the plunger 7 is sandwiched between the stepped portion 314 and the bearing 34A.

As shown in FIG. 2, the bearing 34A is positioned in the direction of the rotation axis X1 by a nut N screwed onto the outer periphery of the fitting portion 313. Movement of the plunger 7 in a direction away from the movable pulley 32 is restricted by the bearing 34A and the nut N.

As shown in FIG. 3, the plunger 7 fixed to the shaft portion 311 includes a flange portion 701 provided in a direction perpendicular to the rotation axis X1 at the outer periphery 70a of the base portion 70. The plunger 7 includes a disk portion 702 provided in a direction perpendicular to the rotation axis X1 at an inner periphery 70b of the base portion 70.

A thickness W701 of the flange portion 701 in the direction of the rotation axis X1 is larger than a thickness W702 of the disk portion 702 in the direction of the rotation axis X1 (W701>W702).

The plunger 7 is formed by press-molding a metal plate. The flange portion 701 and the disk portion 702 are provided such that positions thereof are shifted in the direction of the rotation axis X1.

In order to avoid interference with the annular base portion 321 (the large diameter portion 321a and the small diameter portion 321b) of the movable pulley 32, a region between the flange portion 701 of the base portion 70 and the disk portion 702 of the base portion 70 has an inner diameter that increases stepwise from the disk portion 702 toward the flange portion 701.

The plunger 7 includes a first cylindrical wall portion 703, a first connecting portion 704, a second cylindrical wall portion 705, and a second connecting portion 706 in order from the disk portion 702 in the region between the flange portion 701 and the disk portion 702.

The first cylindrical wall portion 703, the first connecting portion 704, the second cylindrical wall portion 705, and the second connecting portion 706 are formed at a thickness substantially equal to the thickness W702 of the disk portion 702 described above. That is, the plunger 7 includes a thin-walled region formed at a thickness smaller than that of the flange portion 701 on the inner diameter side relative to the flange portion 701.

The first cylindrical wall portion 703 has a cylindrical shape surrounding the rotation axis X1 with an interval therebetween. An end portion of the first cylindrical wall portion 703 on the bearing 34A side (left side in the drawing) is connected to an outer periphery of the disk portion 702. A connecting portion between the disk portion 702 and the first cylindrical wall portion 703 is curved in a direction away from the bearing 34A. Accordingly, the plunger 7 is in contact only with an inner race 34A1 of the bearing 34A.

The first cylindrical wall portion 703 is formed at an inner diameter larger than the outer diameter of the small diameter portion 321b of the movable pulley 32. The first cylindrical wall portion 703 extends in a direction away from the bearing 34A along the rotation axis X1 from a lateral side of an outer race 34A2 of the bearing 34A.

The first connecting portion 704 is provided in a direction perpendicular to the rotation axis X1. The first connecting portion 704 extends radially outward from an end portion of the first cylindrical wall portion 703 on the second cylindrical wall portion 705 side (right side in the drawing).

The second cylindrical wall portion 705 has a cylindrical shape surrounding the rotation axis X1 with an interval therebetween. The second cylindrical wall portion 705 is formed at an inner diameter larger than that of the first cylindrical wall portion 703. Furthermore, the second cylindrical wall portion 705 is formed at an inner diameter larger than an outer diameter of the large diameter portion 321a of the movable pulley 32.

An end portion of the second cylindrical wall portion 705 on the bearing 34A side (left side in the drawing) is connected to the first connecting portion 704. The second cylindrical wall portion 705 extends in a direction away from the bearing 34A along the rotation axis X1.

The second connecting portion 706 extends in a direction away from the bearing 34A (right direction in the drawing) from an end portion of the second cylindrical wall portion 705 on the flange portion 701 side (right side in the drawing).

The second connecting portion 706 is inclined in a direction in which an inner diameter of the second connecting portion 706 increases toward the flange portion 701 away from the bearing 34A.

The flange portion 701 is provided in a direction perpendicular to the rotation axis X1. The flange portion 701 extends radially outward from an end portion of the second connecting portion 706.

An accommodation groove 72 for the D-ring 8 is formed on an outer periphery of the flange portion 701. The accommodation groove 72 is formed at a central portion of the flange portion 701 in a thickness direction (the direction of the rotation axis X1), facing the outer diameter side. The accommodation groove 72 is provided over the entire circumference in the circumferential direction around the rotation axis X1 (see FIG. 5).

The D-ring 8 is externally fitted and attached in the accommodation groove 72. The D-ring 8 protrudes radially outward from the outer periphery 70a of the plunger 7.

The disk portion 702 of the plunger 7 on the inner periphery 70b side is positioned by the shaft portion 311 of the fixed pulley 31.

In the primary pulley 3, when the sheave portion 322 of the movable pulley 32 is arranged at the farthest position (FIG. 3) from the sheave portion 312 of the fixed pulley 31, the flange portion 701 (right side in the drawing) of the plunger 7 relative to the first connecting portion 704 is located inside the cylinder portion 323.

In this state, the outer periphery 70a of the plunger 7 is provided on the inner periphery 323b of the cylinder portion 323 with a gap therebetween in the radial direction of the rotation axis X1. The gap between the inner periphery 323b of the cylinder portion 323 and the outer periphery 70a of the plunger 7 is sealed with the D-ring 8. The D-ring 8 is provided on the outer periphery of the flange portion 701 and is elastically in contact with the inner periphery 323b of the cylinder portion 323.

Furthermore, the oil chamber R1 to which a hydraulic fluid pressure is supplied is defined between the plunger 7 and the sheave portion 322.

The flange portion 701 is a region that can be visually recognized from the side cover 13 in the direction of the rotation axis X1. As described above, the support wall portion 131 of the side cover 13 is provided in a direction perpendicular to the rotation axis X1. The support wall portion 131 and the flange portion 701 have a positional relationship of being parallel to each other and are provided with an interval therebetween in the direction of the rotation axis X1.

In the support wall portion 131, an attachment hole 131b for the sensor 120 penetrates the support wall portion 131 in the direction of the rotation axis X1. The sensor 120 is assembled to the side cover 13 by being inserted into the attachment hole 131b from the outside of the side cover 13. In this state, the sensor 120 is provided in a direction along the rotation axis X1. A detection portion 120a at a tip end of the sensor 120 faces the flange portion 701 of the plunger 7 with an interval therebetween on a center line C120 of the sensor 120.

The detection target portions to be detected by the detection portion 120a of the sensor 120 are provided on a surface of the flange portion 701 on the support wall portion 131 side.

Specifically, the convex portions 73 that function as detection target portions are provided on the surface of the flange portion 701 on the support wall portion 131 side (left side in the drawing).

In the present embodiment, the flange portion 701 is formed when the plunger 7 is press-molded. The convex portions 73 of the flange portion 701 are formed by a half-blanking process on the flange portion 701.

Accordingly, concave portions 74 recessed inside the flange portion 701 are formed on the flange portion 701. The concave portions 74 are formed on a side opposite to the convex portions 73 in the thickness direction of the flange portion 701. A protrusion height d1 of the convex portions 73 and a depth d2 of the concave portions 74 are substantially the same.

The half-blanking process may be performed on the surface of the flange portion 701 on the support wall portion 131 side (left side in the drawing) so that concave portions are formed on the surface.

In this case, the concave portions formed in the surface on the support wall portion 131 side (left side in the drawing) are used as detection target portions.

In addition, a configuration in which the convex portions 73 or the concave portions 74 are provided only on the surface on the support wall portion 131 side (left side in the drawing) may be used. In this case, a surface of the flange portion 701 opposite to the support wall portion 131 is a flat surface.

As shown in FIGS. 4 and 4A, each of the convex portions 73 has a substantially rectangular shape when viewed from the direction of the rotation axis X1. A radial length La of the convex portions 73 is larger than a circumferential length Lb of the convex portions 73. A plurality of convex portions 73 are provided over the entire circumference in the circumferential direction around the rotation axis X1. The plurality of convex portions 73 are arranged with an interval Wx from each other.

The plurality of convex portions 73 of the flange portion 701 all have the same shape.

As shown in FIG. 2, the convex portions 73 protrude from the plunger 7 toward the side cover 13 side (left side in the drawing). The detection portion 120a of the sensor 120 supported by the support wall portion 131 and the region of the plunger 7 provided with the convex portion 73 face each other on the center line C120 of the sensor 120 with an interval therebetween.

Accordingly, when the primary pulley 3 rotates around the rotation axis X1, the convex portions 73, which are the detection target portions, pass in front of the detection portion 120a of the sensor 120 at a cycle corresponding to the rotation speed. As a result, the sensor 120 outputs a pulse corresponding to the passage cycle of the convex portion 73.

In the side cover 13, the support hole 15 for the bearing 34A is formed on an inner diameter side of the support wall portion 131 on which the sensor 120 is provided. A concave portion 151 used to avoid interference with the shaft portion 311 of the fixed pulley 31 is formed in a central portion of the support hole 15.

In the side cover 13, a bearing retainer 9 (retainer) is provided on the inner diameter side of the support wall portion 131.

Figure 6:
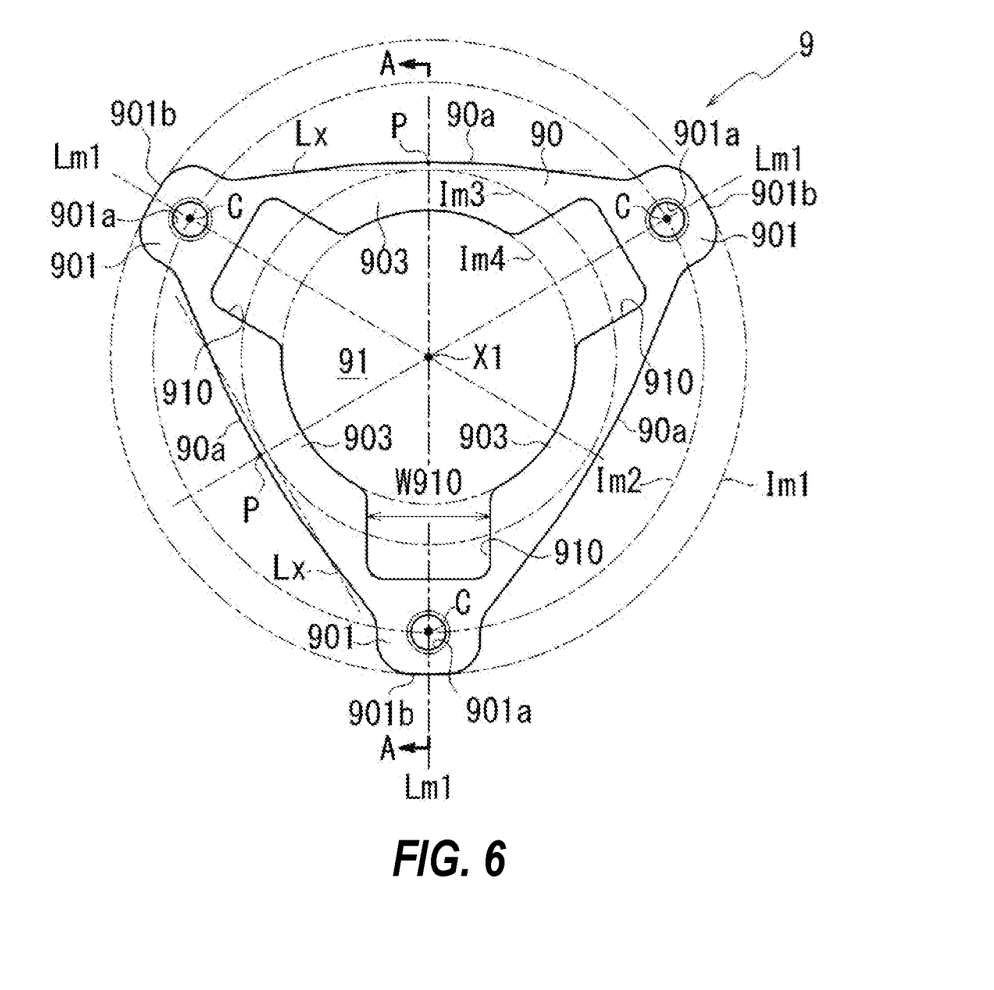
FIG. 6 is a plan view of a bearing retainer.

In order to avoid interference with the sensor 120 described above, an outer shape of the bearing retainer 9 when viewed from the direction of the rotation axis X1 is a substantially triangular shape (see FIG. 6).

Figure 7:
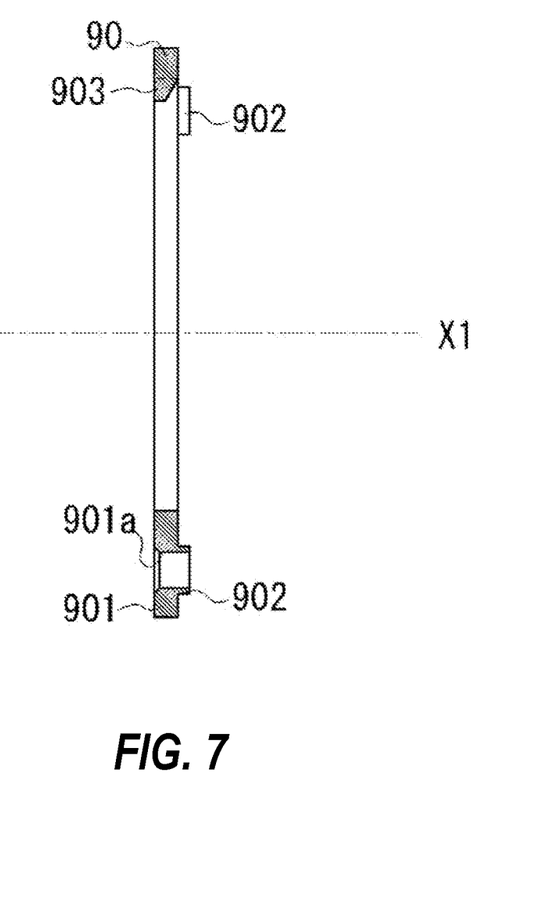
FIG. 7 is a perspective view showing a part of a cross-section of the bearing retainer.

FIG. 6 is a plan view of the bearing retainer 9. FIG. 7 is a cross-sectional view of the bearing retainer 9 taken along the line A-A in FIG. 6.

As shown in FIGS. 6 and 7, the bearing retainer 9 has a plate-shaped base portion 90. An opening 91 having a substantially circular shape is provided in a central portion of the base portion 90. An inner periphery surrounding the opening 91 of the base portion 90 is located on a virtual circle Im4 surrounding the rotation axis X1 with an interval therebetween.

In the base portion 90, coupling pieces 901 are provided at intervals of 120 degrees in the circumferential direction around the rotation axis X1. The coupling pieces 901 extend radially outward from respective outer peripheries 90a of the base portion 90 along straight lines Lm1 passing through a center (rotation axis X1) of the virtual circle Im4. In other words, the coupling pieces 901 protrude radially outward from the respective outer peripheries 90a of the base portion 90. Outer peripheries 901b of the coupling pieces 901 are located on a virtual circle Im1 surrounding the rotation axis X1 with an interval therebetween.

Bolt holes 901a are formed in the coupling pieces 901. Each of the bolt holes 901a penetrates the coupling piece 901 in a thickness direction (direction of the rotation axis X1). When viewed from the direction of the rotation axis X1, a center C of the bolt hole 901a is located on a virtual circle Im2 surrounding the rotation axis X1 with an interval therebetween. The virtual circle Im2 has a diameter smaller than that of the virtual circle Im1 (Im1>Im2).

The bolt hole 901a is located on the straight line Lm1 located at the intervals of 120 degrees in the circumferential direction around the rotation axis X1. Here, the straight line Lm1 correspond to diameter lines of the virtual circles Im1, Im2, Im3, and Im4.

As shown in FIG. 7, a tubular portion 902 is provided on one surface of the coupling piece 901 in the thickness direction of the base portion 90 (direction of the rotation axis X1). The tubular portion 902 surrounds the bolt hole 901a over the entire circumference. The tubular portion 902 protrudes from the coupling piece 901 to one side of the coupling piece 901 in the thickness direction.

In the base portion 90, the outer peripheries 90a of regions between the coupling pieces 901 adjacent in the circumferential direction around the rotation axis X1 are located closer to the rotation axis X1 than the coupling pieces 901.

The outer periphery 90a has an arc shape when viewed from the direction of the rotation axis X1. In the outer periphery 90a, regions on both sides with respect to an intersection point P with the straight line Lm1 are located outside a tangent line Lx of the virtual circle Im3. Then, regions in the vicinity of the coupling pieces 901 in the outer periphery 90a are located inside (rotation axis X1 side) the tangent line Lx. The virtual circle Im3 is a virtual circle having a diameter smaller than that of the virtual circle Im2 and passing through the intersection points P of the straight lines Lm1 with the outer periphery 90a.

In the base portion 90, concave portions 910 communicating with the opening 91 are provided in regions intersecting the straight lines Lm1. Each of the concave portions 910 is formed at a width W910 in a direction perpendicular to the straight line Lm1. The concave portion 910 extends radially outward from the opening 91. An outer diameter side of the concave portion 910 extends to the vicinity of the coupling piece 901 beyond the virtual circle Im3.

Support pieces 903 that support the outer race 34A2 (see FIG. 3) of the bearing 34A are provided on an inner diameter side of the base portion 90. Each of the support pieces 903 is formed in a region between the concave portions 910 adjacent in the circumferential direction.

The support piece 903 is provided with the concave portions 910 on both sides in the circumferential direction so that an inner periphery side (rotation axis X1 side) of the support piece 903 can be slightly elastically displaced in the direction of the rotation axis X1.

As shown in FIG. 2, the bearing 34A is attached to the support hole 15 of the side cover 13. The bearing retainer 9 is positioned on a surface of the side cover 13 on the movable pulley 32 side (right side in the drawing) using the plunger 7.

Then, a bolt B is screwed into the bolt hole 17a provided in the side cover 13. A shaft portion B1 of the bolt B passes through the bolt hole 901a provided in the coupling piece 901 of the bearing retainer 9 and the tubular portion 902. As a result, the bearing retainer 9 is pulled toward the side cover 13 by an engaging force of the bolt B. The support piece 903 of the bearing retainer 9 is arranged at a position at which the outer race 34A2 of the bearing 34A is supported (see FIG. 3).

In this state, the support wall portion 131 of the side cover 13 and the sensor 120 supported by the support wall portion 131 are located radially outside the outer periphery 90a of the bearing retainer 9.

Then, the detection portion 120a of the sensor 120 and the convex portions 73, which are the detection target portions of the plunger 7, face each other.

Figure 8:
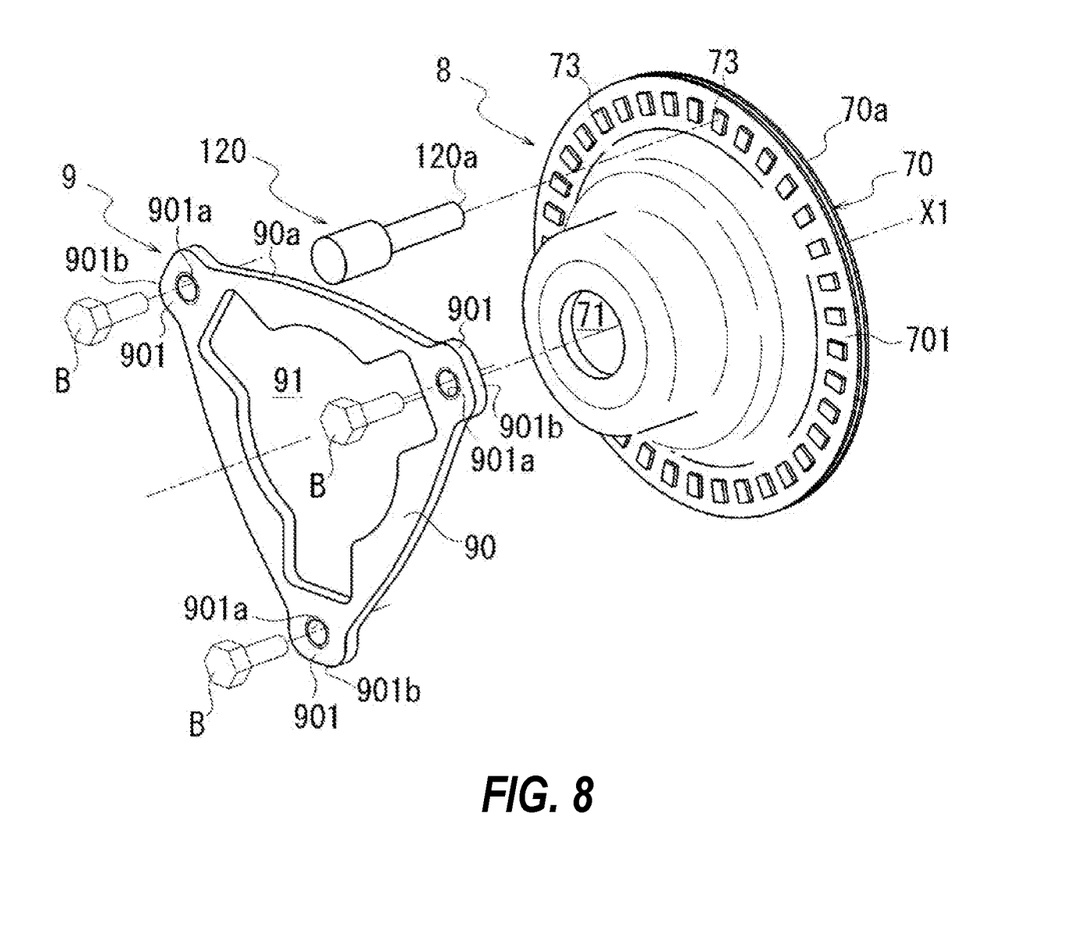
FIG. 8 shows a positional relationship between the retainer, the plunger, and a sensor.
Figure 9:
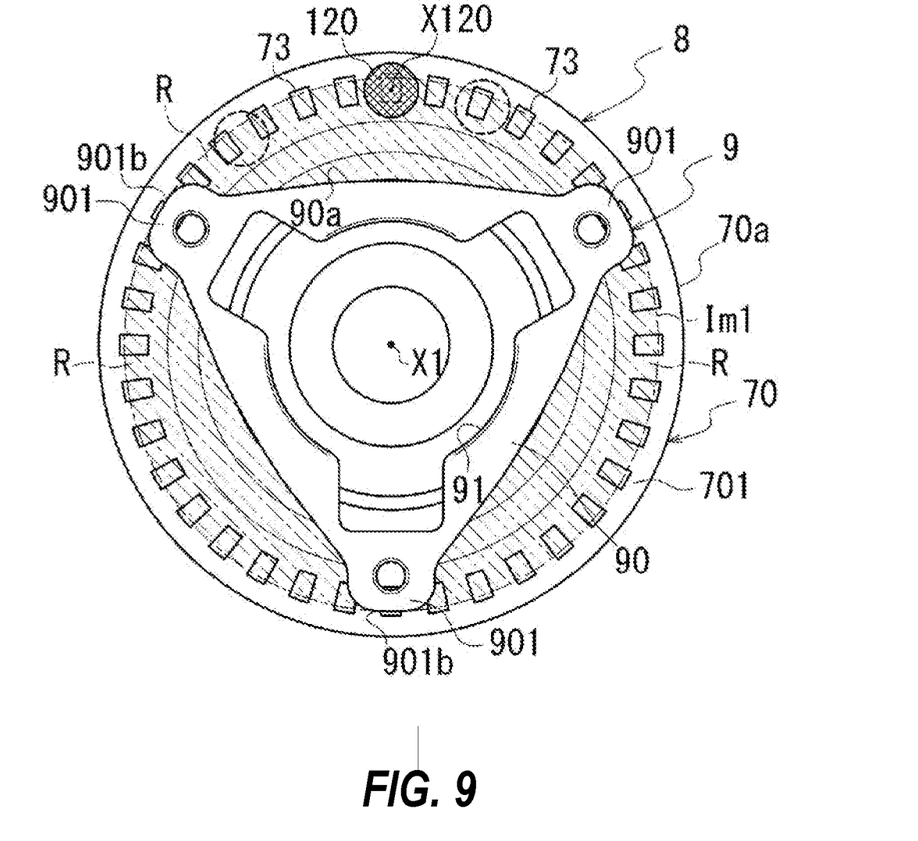
FIG. 9 shows the positional relationship between the retainer, the plunger, and the sensor.

FIGS. 8 and 9 show a positional relationship between the bearing retainer 9, the plunger 7, and the sensor 120.

FIG. 8 shows a state where the bearing retainer 9, the plunger 7, the sensor 120, and the bolts B are arranged in a spaced apart manner in the direction of the rotation axis X1.

FIG. 9 shows a state where the bearing retainer 9, the plunger 7, and the sensor 120 are viewed from the direction of the rotation axis X1.

As shown in FIGS. 8 and 9, the outer shape of the plunger 7 is a circular shape when viewed from the direction of the rotation axis X1. The outer shape of the bearing retainer 9 is a substantially triangular shape when viewed from the direction of the rotation axis X1.

Therefore, when viewed from the rotation axis X1, an extra space is present radially outside the outer peripheries 90a of the base portion 90 (see hatched regions R in FIG. 9). This space has a size in which the sensor 120 can be arranged.

As shown in FIG. 9, when viewed from the direction of the rotation axis X1, the convex portions 73 formed on the flange portion 701 of the plunger 7 are located on the virtual circle Im1.

As described above, the outer peripheries 901b of the coupling pieces 901 of the bearing retainer 9 are located on the virtual circle Im1, but the outer peripheries 90a of the base portion 90 are located radially inward of the virtual circle Im1. That is, the regions R surrounded by the virtual circle Im1 on the radially outer side of the outer peripheries 90a of the base portion 90 are regions where the sensor 120 can be arranged without being interfered by the bearing retainer 9. Each of the regions R is a region where the convex portions 73 formed on the plunger 7 can be visually recognized when viewed from the side cover 13 (see FIG. 3) in the direction of the rotation axis X1. The bearing retainer 9 does not overlap the plunger 7 in the region R when viewed from the direction of the rotation axis X1.

Here, as a comparative example, in a case of a bearing retainer having a circular shape when viewed from the direction of the rotation axis, an inner side of the virtual circle Im1 in FIG. 9 is a region of the bearing retainer.

The bearing retainer 9 of the present embodiment corresponds to a bearing retainer obtained by notching the regions indicated by symbols R in the drawing from the bearing retainer of the comparative example.

That is, the regions R correspond to portions obtained by partially notching a region of the bearing retainer of the comparative example on an outer periphery side such that each outer periphery 90a of the bearing retainer 9 passes through a center side (rotation axis X1 side) relative to the outer periphery (virtual circle Im1) of the bearing retainer having a circular shape of the comparative example. In other words, the regions R correspond to portions obtained by notching the region of the bearing retainer of the comparative example on the outer periphery side, leaving the coupling pieces 901.

The regions R can provide an extra space both in the radial direction of the rotation axis X1 and in the axial direction of the rotation axis X1.

The sensor 120 is arranged using the regions R on the radially outer side of the outer periphery 90a.

Specifically, as shown in FIG. 3, the support wall portion 131 is closer to the plunger 7 than to the bearing retainer 9. This support wall portion 131 supports the sensor 120.

By providing the sensor 120 on the support wall portion 131, the sensor 120 is closer to the plunger 7 than to the bearing retainer 9. Accordingly, a region where the sensor 120 is provided in a housing of the continuously variable transmission 1 can be made smaller in the direction of the rotation axis X1.

In addition, in the case of the bearing retainer of the comparative example, which has a circular shape when viewed from the direction of the rotation axis X1, in order to avoid interference with the bearing retainer 9, the sensor 120 needs to be arranged outside the virtual circle Im1 in FIG. 9.

As a result, the region in the housing of the continuously variable transmission 1 where the sensor 120 is provided is large in the radial direction of the rotation axis X1.

In the present embodiment, the bearing retainer 9 has a substantially triangular shape when viewed from the direction of the rotation axis X1. The regions R where the sensor 120 can be arranged is secured outside the outer periphery 90a when viewed from the direction of the rotation axis X1.

Therefore, the sensor 120 can face the region where the convex portion 73 of the plunger 7 is provided.

Accordingly, compared to the bearing retainer of the comparative example, which has a circular shape when viewed from the direction of the rotation axis X1, it is possible to suitably prevent the region of the housing of the continuously variable transmission 1 where the sensor 120 is provided from being large in the radial direction of the rotation axis X1.

In particular, the sensor 120 may be arranged in a region facing any convex portion 73 as long as such a region is within the regions R. For example, in FIG. 9, the sensor 120 is arranged at a hatched position, but the sensor 120 may also be arranged at positions surrounded by dashed circles in the drawing. Therefore, a degree of freedom in arranging the sensor 120 is increased.

Furthermore, as a comparative example, when a sensor is provided in a direction perpendicular to a rotation axis of a pulley, it is necessary for the sensor to avoid interference with components of a movable pulley that is displaced in a direction of the rotation axis.

Therefore, there are restrictions on where a sensor can be provided in a belt continuously variable transmission.

On the other hand, the present embodiment adopts the following configurations.

(a) The sensor 120 is provided on the side cover 13 that rotatably supports the fixed pulley 31 in the direction along the rotation axis X1.

(b) The convex portions 73, which are detection target portions to be detected by the sensor 120, are provided in a region of the plunger 7, which can be visually recognized from the direction of the rotation axis X1.

Therefore, the sensor 120 can be arranged without considering a moving range of the movable pulley displaced in the direction of the rotation axis X1. Therefore, the degree of freedom in providing the sensor 120 can be further increased.

An example of the sensor arrangement structure 100 according to one aspect of the present invention will be listed below.

(1) The sensor arrangement structure 100 includes:
the primary pulley 3 (a pulley) that rotates about the rotation axis X1; and
the sensor 120 that detects rotation of the primary pulley 3.

The primary pulley 3 includes
the fixed pulley 31,
the movable pulley 32 that can be displaced relative to the fixed pulley 31 in a direction of the rotation axis X1, and
the plunger 7 fixed to the fixed pulley 31 and defining the oil chamber R1 on the back 322b of the movable pulley 32.

The plunger 7 is provided with the convex portions 73, which are detection target portions, in the flange portion 701, which is a region that can be visually recognized from the direction of the rotation axis X1.

The sensor 120 is provided on the support wall portion 131 of the side cover 13 (a support portion) that rotatably supports the fixed pulley 31 in a direction along the rotation axis X1 and faces the region in which the convex portions 73 of the plunger 7 are provided.

As a comparative example, when a sensor is provided in a direction perpendicular to a rotation axis of a pulley, it is necessary for the sensor to avoid interference with components of a movable pulley that is displaced in a direction of the rotation axis. As a result, a size of a continuously variable transmission in the direction of the rotation axis is increased.

As described above, in the embodiment, the sensor 120 is arranged using the plunger 7 used to define the oil chamber R1. The convex portions 73, which are detection target portions, are provided on the flange portion 701 of the plunger 7, which is a region that can be visually recognized from the direction of the rotation axis X1. As a result, it is not necessary to arrange the sensor 120 in consideration of the interference with the components of the movable pulley 32. Therefore, it is possible to suitably prevent the size of the continuously variable transmission 1 in the direction of the rotation axis X1 from increasing.

As a result, the degree of freedom in providing the sensor 120 can be further increased.

(2) The movable pulley 32 includes the cylinder portion 323 (a cylindrical wall portion) surrounding the rotation axis X1 with an interval therebetween on the back 322b of the sheave portion 322.

The plunger 7 includes, on the outer periphery 70a side (an outer diameter side), the flange portion 701 (a flat plate portion) extending in a radial direction of the rotation axis X1 from an inner diameter side of the cylinder portion 323.

The convex portion 73, which is a detection target portion, is provided on the flange portion 701.

In this way, since the plunger 7, which is an existing component of the continuously variable transmission 1, is provided with the convex portion 73, which is the detection target portion, it is not necessary to separately provide a separate component for sensing, such as a pulse gear.

When a separate component for sensing is provided, a length of the continuously variable transmission 1 in the direction of the rotation axis X1 is increased by the separate component. Since no separate components are used, it is possible to suitably prevent the continuously variable transmission 1 from being large in the direction of the rotation axis X1. In addition, since it is not necessary to increase the number of components for sensing, it is possible to suitably prevent an increase in production cost due to an increase in the number of components.

Furthermore, when the number of components increases, there is a concern about the impact of accumulated tolerances. In the present embodiment, since the number of components is not increased, such a concern can be reduced.

(3) The detection target portions may be the convex portions 73 that protrude in the direction of the rotation axis X1 or the concave portions 74 that are recessed in the direction of the rotation axis X1.

With this configuration, the convex portions 73 that protrude in the direction of the rotation axis X1 or the concave portions 74 that are recessed in the direction of the rotation axis X1 can be easily formed on the flange portion 701 of the plunger 7 by performing, for example, a half-blanking process.

(4) The plunger 7 includes the accommodation groove 72 of the D-ring 8 (a seal support portion) on an outer periphery of the flange portion 701 (the flat plate portion). The D-ring 8 externally fitted in the accommodation groove 72 seals a gap between the inner periphery 323b of the cylinder portion 323 of the movable pulley 32 and the outer periphery 70a of the flange portion 701.

The plunger 7 may include a thin-walled region having a thickness smaller than a thickness of the flange portion 701 in which the accommodation groove 72 is formed, on an inner diameter side relative to the flange portion 701.

The thin-walled region is a region in which the first cylindrical wall portion 703, the first connecting portion 704, the second cylindrical wall portion 705, and the second connecting portion 706 on the inner diameter side of the flange portion 701 are provided.

With this configuration, it is possible to secure a support strength of the D-ring 8 and improve sealing performance at the flange portion 701. Furthermore, by forming the portions other than the flange portion 701 at a small thickness, a weight of the plunger 7 can be reduced. That is, it is possible to achieve both improvement in the sealing performance and weight reduction of the plunger 7.

In addition, the thin-walled region is formed in a shape whose diameter increases stepwise toward the flange portion 701. Therefore, a rigidity of the plunger 7 can be ensured even when the thickness of the thin-walled region is reduced by about 10% from a thickness of the flange portion 701. Therefore, it is possible to reduce the weight of the plunger 7 while ensuring the rigidity of the plunger 7.

(5) The convex portion 73, which is a detection target portion, may avoid a boundary between the flange portion 701 in which the accommodation groove 72 is formed, which is a seal support portion, and the thin-walled region having a thickness smaller than the thickness of the flange portion 701.

As a comparative example, when the convex portion 73 is formed across the boundary between the flange portion 701 and the thin-walled region, a shape of the convex portion 73 may be deformed from a designed shape. When the shape of the convex portion 73 is deformed, detection of the convex portion 73 by the sensor 120 is affected, and an output pulse of the sensor 120 may have a shape different from an expected shape. In such a case, there is a possibility that a rotation speed of the primary pulley 3 cannot be detected appropriately.

By providing the convex portion 73 on the flange portion 701 while avoiding the boundary between the flange portion 701 and the thin-walled region, the convex portion 73 can be formed in an appropriate shape. Thereby, the rotation speed of the primary pulley 3 can be detected appropriately.

(6) The fixed pulley 31 is rotatably supported by the side cover 13 (the support portion) via the bearing 34A.

The side cover 13 is provided with the bearing retainer 9 (retainer) that restricts movement of the bearing 34A in the direction of the rotation axis X1.

In the bearing retainer 9 when viewed from the rotation axis X1 direction, the coupling pieces 901, which are coupling portions coupled with the side cover 13, are provided with intervals in a circumferential direction around the rotation axis X1, the outer periphery 90a between the coupling pieces 901 adjacent in the circumferential direction around the rotation axis X1 is located closer to the rotation axis X1 than to the coupling pieces 901.

The region where the convex portion 73 (detection target portion) of the plunger 7 is provided is located on the outer diameter side of the outer periphery 90a of the bearing retainer 9 such that the region can be visually recognized when viewed from the direction of the rotation axis X1.

With this configuration, the region R where the sensor 120 can be arranged is secured outside the outer periphery 90a when viewed from the direction of the rotation axis X1.

Therefore, the sensor 120 can face the region where the convex portion 73 of the plunger 7 is provided.

Accordingly, compared to the bearing retainer of the comparative example, which has a circular shape when viewed from the direction of the rotation axis X1, it is possible to suitably prevent the region of the housing of the continuously variable transmission 1 where the sensor 120 is provided from being large in the radial direction of the rotation axis X1.

In the embodiment described above, the outer shape of the bearing retainer 9 when viewed from the direction of the rotation axis X1 is exemplified as a substantially triangular shape in order to avoid the interference with the sensor 120.

The shape of the bearing retainer may be a shape by which the interference with the sensor 120 can be avoided. For example, as shown in FIG. 10, a bearing retainer 9A having a substantially quadrangular shape may be used.

Figure 10:
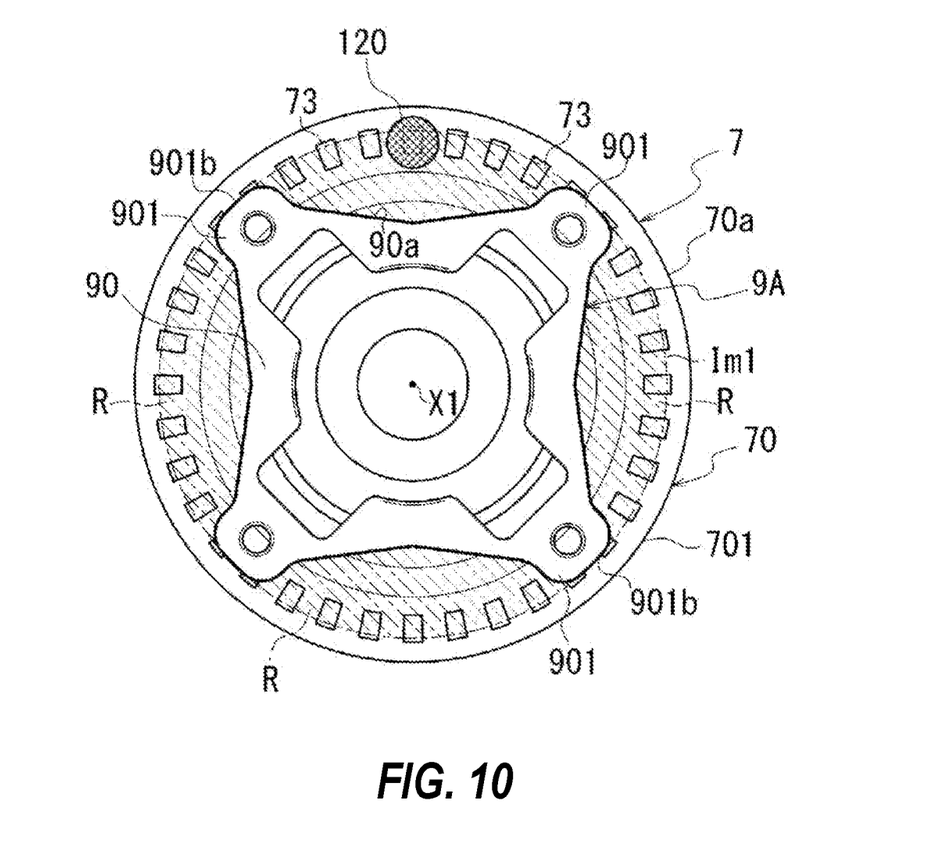
FIG. 10 shows another aspect of the bearing retainer.

FIG. 10 shows the bearing retainer 9A (retainer) according to a modification. FIG. 10 shows the bearing retainer 9A, the sensor 120, and the plunger 7 in an overlapped form.

As shown in FIG. 10, an outer shape of the bearing retainer 9A is a substantially quadrangular shape when viewed from the direction of the rotation axis X1.

The base portion 90 of the bearing retainer 9A is provided with the coupling pieces 901 with intervals of 90 degrees in the circumferential direction around the rotation axis X1. The outer periphery 90a of a region between the coupling pieces 901 adjacent in the circumferential direction around the rotation axis X1 is located closer to the rotation axis X1 than to the coupling pieces 901.

In the bearing retainer 9A, the outer shape of the bearing retainer 9A is a substantially quadrangular shape when viewed from the direction of the rotation axis X1.

Therefore, when viewed from the rotation axis X1, an extra space in which the sensor 120 can be arranged is present radially outside the outer periphery 90a of the base portion 90 (see hatched regions R in FIG. 10).

As shown in FIG. 10, the outer peripheries 901b of the coupling pieces 901 of the bearing retainer 9A are located on the virtual circle Im1, but the outer periphery 90a of the base portion 90 is located radially inward of the virtual circle Im1. That is, the regions R surrounded by the virtual circle Im1 on the radially outer side of the outer periphery 90a of the base portion 90 are regions where the sensor 120 can be arranged without being interfered by the bearing retainer 9A. Each of the regions R is a region where the convex portions 73 formed on the plunger 7 can be visually recognized when viewed from the side cover 13 (see FIG. 3) in the direction of the rotation axis X1. The bearing retainer 9A does not overlap the plunger 7 in the region R when viewed from the direction of the rotation axis X1.

The regions R can provide an extra space both in the radial direction of the rotation axis X1 and in the axial direction of the rotation axis X1.

Accordingly, even when the bearing retainer 9A is adopted, it is possible to suitably prevent the region of the housing of the continuously variable transmission 1 where the sensor 120 is provided from being large in the direction of the rotation axis X1 and in the radial direction of the rotation axis X1.

As an aspect of the present invention, an example in which the sensor arrangement structure is applied to a vehicle has been described. The present invention is not limited to the aspect. The sensor arrangement structure can be applied to other than a vehicle.

Although the embodiment of the present invention has been described above, the above embodiment merely exemplifies one application example of the present invention and does not intend to limit the technical scope of the present invention to the specific configuration of the above embodiment.

REFERENCE SIGNS LIST 13 side cover (support portion)
131 support wall portion
3 primary pulley (pulley)
31 fixed pulley
32 movable pulley
322 sheave portion
322b back
323 cylinder portion (cylindrical wall portion)
34A and 34B bearing
7 plunger
701 flange portion (flat plate portion 701)
72 accommodation groove (seal support portion)
73 convex portion (detection target portion)
9 and 9A bearing retainer (retainer)
90a outer periphery
901 coupling piece
100 sensor arrangement structure
120 sensor
R region
R1 oil chamber
X1 rotation axis The present application claims a priority of Japanese Patent Application No. 2021-026257 filed with the Japan Patent Office on Feb. 22, 2021, all the contents of which are hereby incorporated by reference.

The invention claimed is:

1. A sensor arrangement structure comprising:
a pulley that rotates about a rotation axis; and
a sensor that detects rotation of the pulley, wherein
the pulley includes
a fixed pulley,
a movable pulley that can be displaced relative to the fixed pulley in a direction of the rotation axis, and
a plunger fixed to the fixed pulley and defining an oil chamber on a back of the movable pulley,
the plunger is provided with a detection target portion in a region that can be visually recognized from the direction of the rotation axis, and
the sensor is provided on a support portion that rotatably supports the fixed pulley in a direction along the rotation axis and faces the region in which the detection target portion is provided.

2. The sensor arrangement structure according to claim 1, wherein
the movable pulley includes a cylindrical wall portion surrounding the rotation axis with an interval therebetween on the back,
the plunger includes, on an outer diameter side, a flat plate portion extending in a radial direction of the rotation axis from an inner diameter side of the cylindrical wall portion, and
the detection target portion is provided on the flat plate portion.

3. The sensor arrangement structure according to claim 2, wherein
the detection target portion is a convex portion that protrudes in the direction of the rotation axis or a concave portion that is recessed in the direction of the rotation axis.

4. The sensor arrangement structure according to claim 2, wherein
the plunger includes a seal support portion on an outer periphery of the flat plate portion, and
the plunger includes a thin-walled region, which has a thickness smaller than a thickness of the seal support portion, on an inner diameter side relative to the seal support portion.

5. The sensor arrangement structure according to claim 4, wherein
the detection target portion avoids a boundary between the seal support portion and the thin-walled region.

6. The sensor arrangement structure according to claim 1, wherein
the fixed pulley is rotatably supported by the support portion via a bearing,
a retainer that restricts movement of the bearing in the direction of the rotation axis is attached to the support portion,
in the retainer when viewed from the direction of the rotation axis,
coupling portions coupled with the support portion are provided with intervals in a circumferential direction around the rotation axis,
outer peripheries between the coupling portions adjacent in the circumferential direction around the rotation axis are located closer to the rotation axis than to the coupling portions, and
when viewed from the direction of the rotation axis, the region of the plunger provided with the detection target portion is located on an outer diameter side of the outer peripheries of the retainer such that the region can be visually recognized.

* * * * *